No. 795,058.

Patented July 18, 1905.

UNITED STATES PATENT OFFICE.

ALEXANDER OTTO, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

BISULFITE COMPOUND OF A TETRAZO DYE AND PROCESS OF MAKING SAME.

SPECIFICATION forming part of Letters Patent No. 795,058, dated July 18, 1905.

Application filed April 19, 1905. Serial No. 256,436.

*To all whom it may concern:*

Be it known that I, ALEXANDER OTTO, Ph. D., chemist, a citizen of the Empire of Germany, residing at Höchst-on-the-Main, Germany, have invented certain new and useful Improvements in the Manufacture of a Bisulfite Compound from a Tetrazo Dyestuff, of which the following is a specification.

I have found that by the action of bisulfites the disazo dyestuff soluble with difficulty obtained from one molecular proportion of ortho-ortho-tetrazophenol-para-sulfonic acid and two molecular proportions of beta-naphthol may be transformed into a readily-soluble bisulfite compound very stable, as mono-sodium salt, which does not become decomposed when dried at a high temperature.

The manufacture of bisulfite compounds became known by the void German Patents Nos. 29,067, 30,598, 30,080, 141,497 and by the publication of A. Spiegel, (*Berichte* 18, 1479.) Especially in Patent No. 141,497 is described the bisulfite compound of the azo dyestuff from para-chloro-ortho-amidophenol-ortho-sulfonic acid and beta-naphthol. By salting out according to this patent the product is obtained as sodium-bisulfite compound, which does not decompose when dried. It was to be expected, therefore, that the dyestuff of United States Patent No. 665,696 treated with bisulfites would behave in a similar manner. This, however, is not the case. The bisulfite compound of said dyestuff may be readily obtained if it is gently heated for a considerable time in the usual manner with the solution of sodium bisulfite. The previously almost insoluble dyestuff becomes gradually dissolved to a deep yellow-brown color; but from this solution the bisulfite compound cannot be obtained by salting out with potassium chlorid. If, however, the bisulfite compound is directly obtained by evaporating the solution, the compound decomposes completely while becoming black. The behavior of the bisulfite compound is totally different, however, if a quantity of a mineral acid equivalent to the bisulfite compound used is added to it previous to being evaporated, so that the reaction is just acid. The solution becomes then of a light yellow-red and may be evaporated to dryness without decomposing.

Example: Two thousand eight hundred parts, by weight, of a paste of thirty-five-per-cent. strength of the dyestuff from one molecular proportion of ortho-ortho-tetrazophenol-para-sulfonic acid and two molecular proportions of beta-naphthol are heated to 55° or 56° centigrade for about five or six hours, while stirring, with one thousand parts, by weight, of a sodium-bisulfite solution of thirty-eight-per-cent. strength. The dyestuff gradually dissolves with a deep yellow-brown color. When all is dissolved, dilute sulfuric acid is added until it is acid to congo and the yellow-red color on filter-paper no longer turns black-violet when exposed to the air. It is then evaporated to dryness.

Having now described my invention, what I claim is—

1. The process herein described for obtaining a solid bisulfite compound of the dyestuff produced from one molecular proportion of ortho-ortho-tetrazophenol-para-sulfonic acid and two molecular proportions of beta-naphthol, which consists in adding to said dyestuff dissolved in a solution of sodium bisulfite a quantity of mineral acid sufficient to just produce an acid reaction and in then evaporating the mixture to dryness.

2. As new product a stable bisulfite compound being a red-brownish powder readily soluble in water, its brown-red solution assuming in the cold a violet color on addition of sodium carbonate and on being heated separating the dyestuff obtained from ortho-ortho-tetrazophenol-para-sulfonic acid and beta-naphthol.

In testimony that I claim the foregoing as my invention I have signed my name in presence of two subscribing witnesses.

ALEXANDER OTTO.

Witnesses:
JEAN GRUND,
CARL GRUND.